July 1, 1952   I. S. EGGLESTON ET AL   2,601,915
TIMING MECHANISM AND CONTROL FOR CONVEYERS
Filed Aug. 21, 1950   9 Sheets-Sheet 1
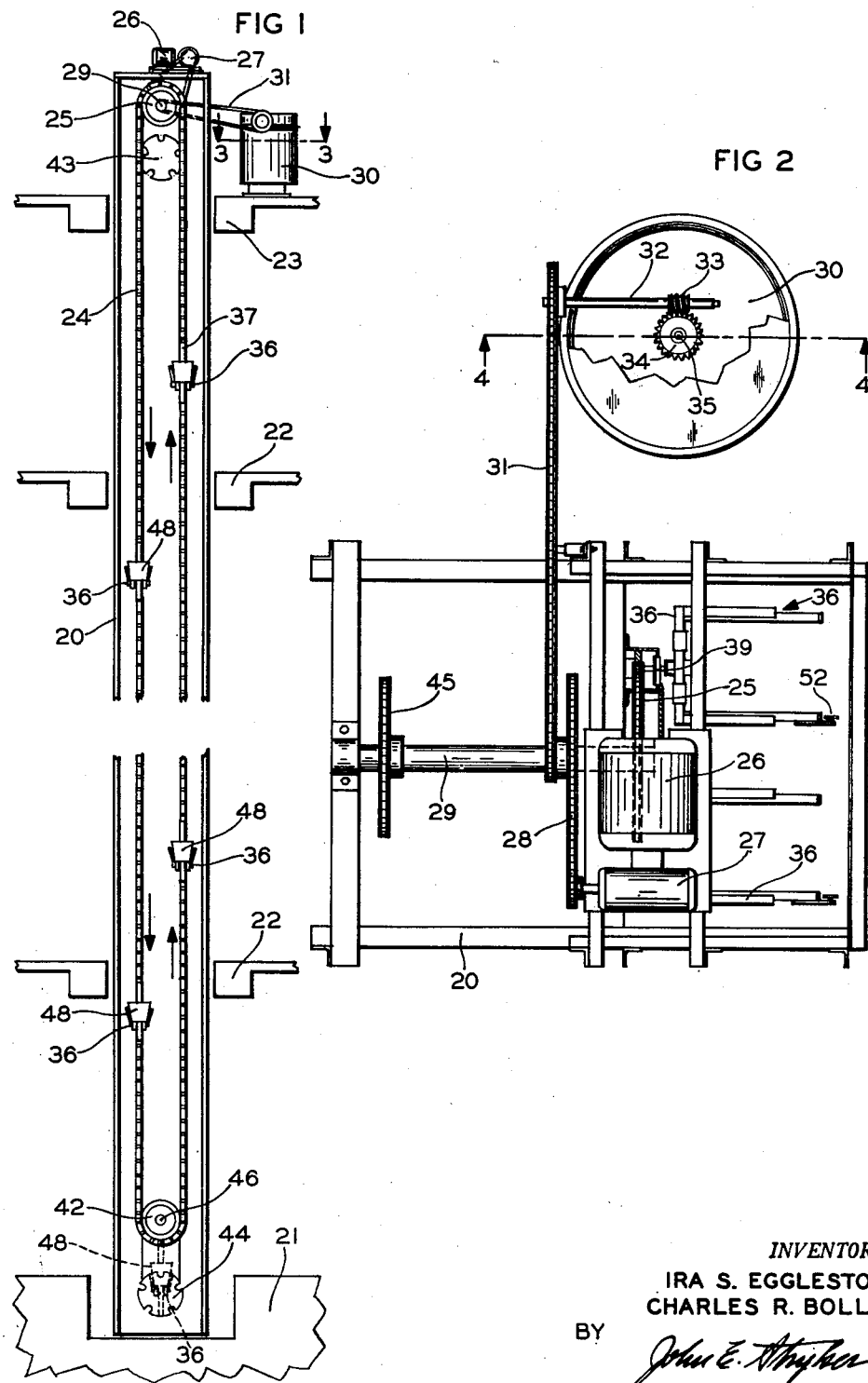
INVENTORS
IRA S. EGGLESTON
CHARLES R. BOLLER
BY
John E. Snyder
ATTORNEY

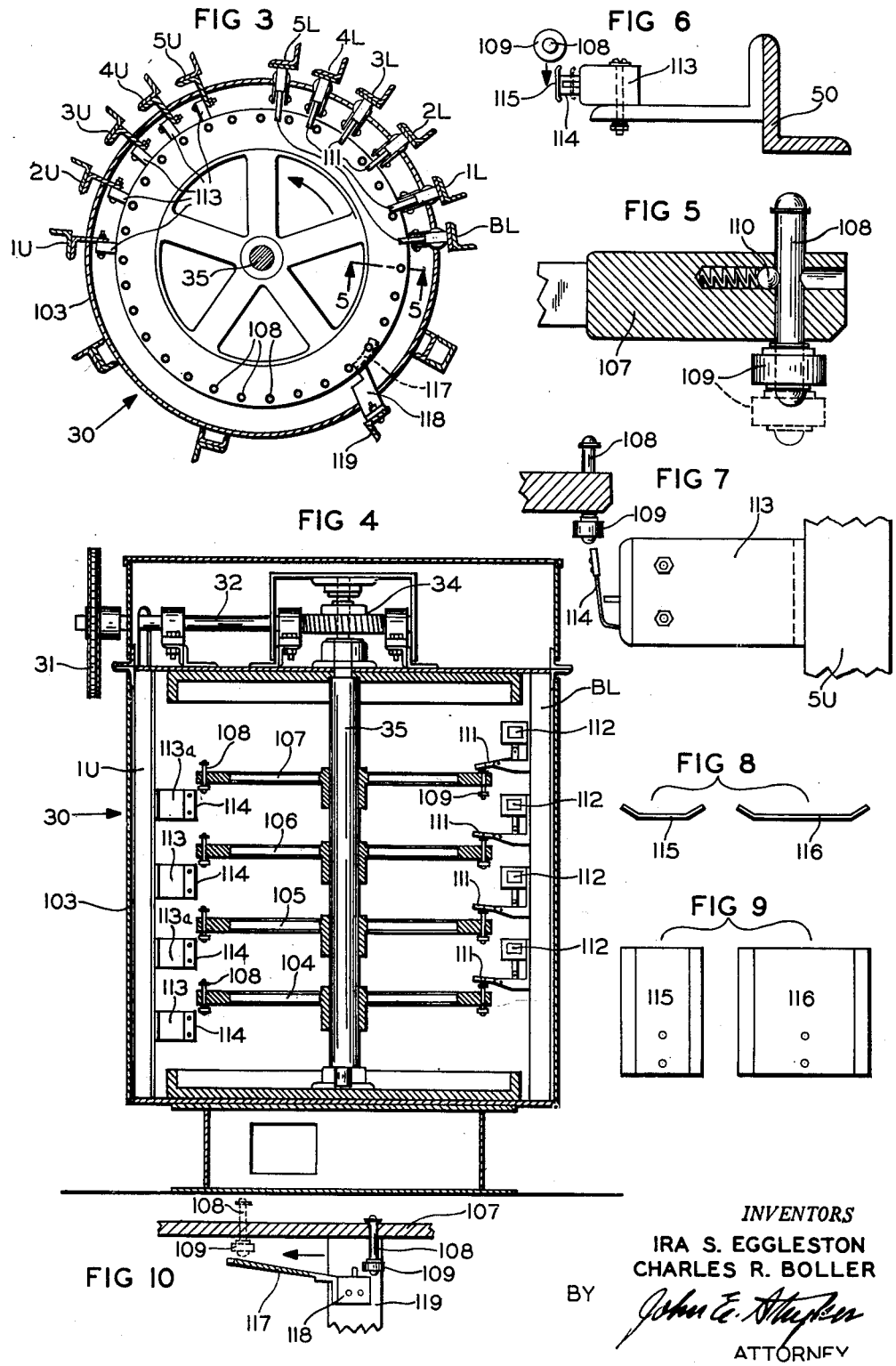

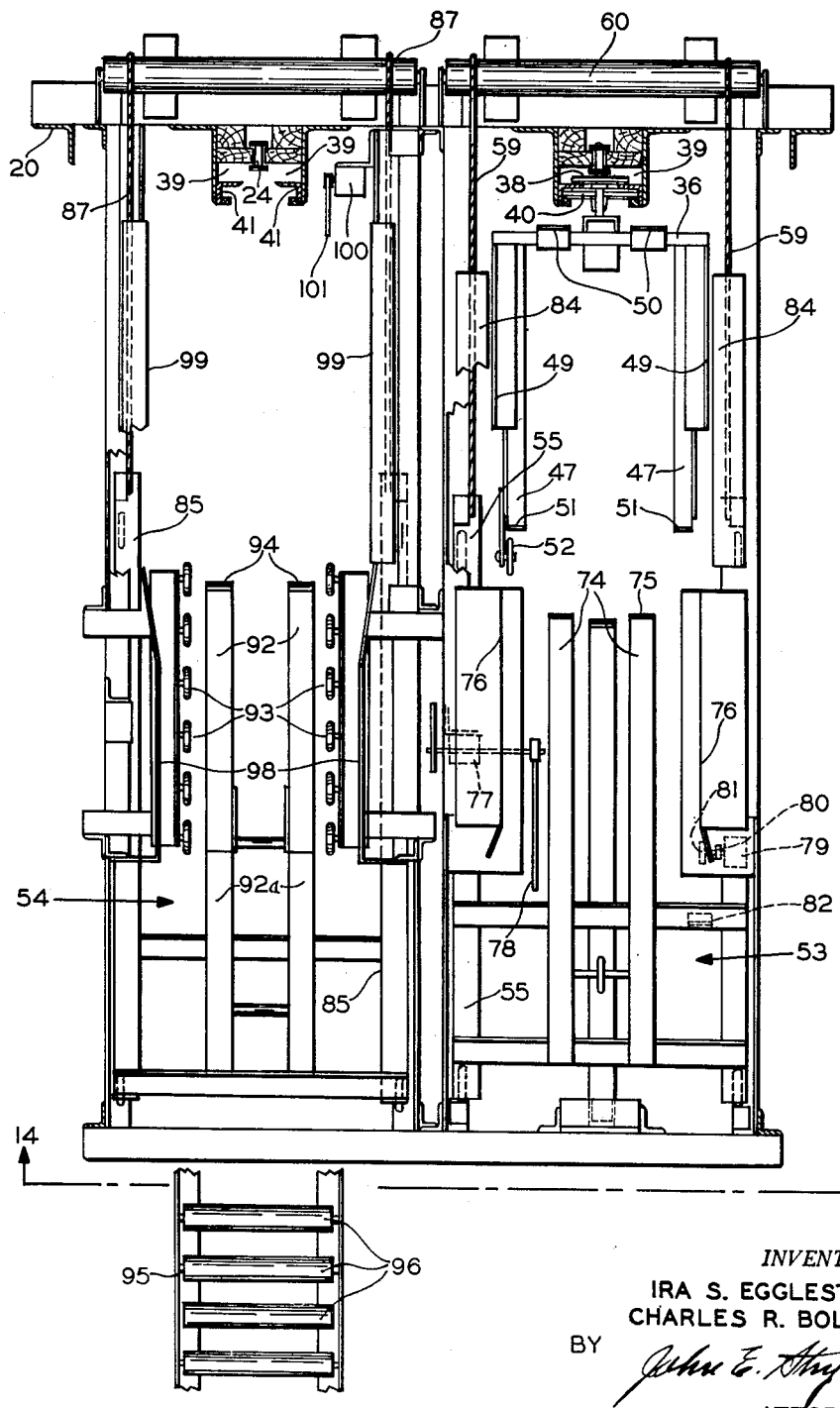

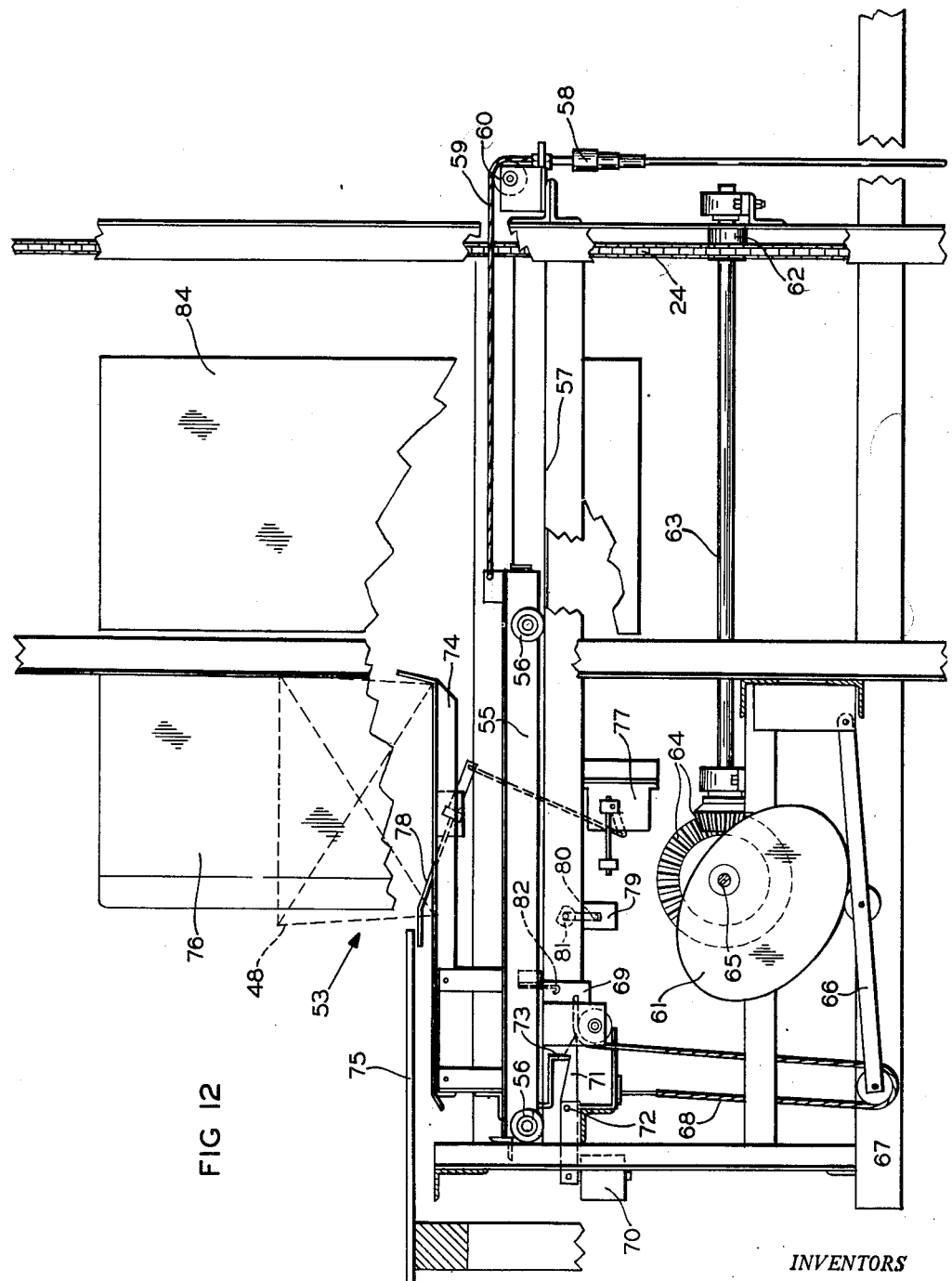

July 1, 1952     I. S. EGGLESTON ET AL     2,601,915
TIMING MECHANISM AND CONTROL FOR CONVEYERS
Filed Aug. 21, 1950     9 Sheets-Sheet 5

INVENTORS
IRA S. EGGLESTON
CHARLES R. BOLLER
BY
*John E. Stryker*
ATTORNEY

July 1, 1952   I. S. EGGLESTON ET AL   2,601,915
TIMING MECHANISM AND CONTROL FOR CONVEYERS
Filed Aug. 21, 1950   9 Sheets-Sheet 6
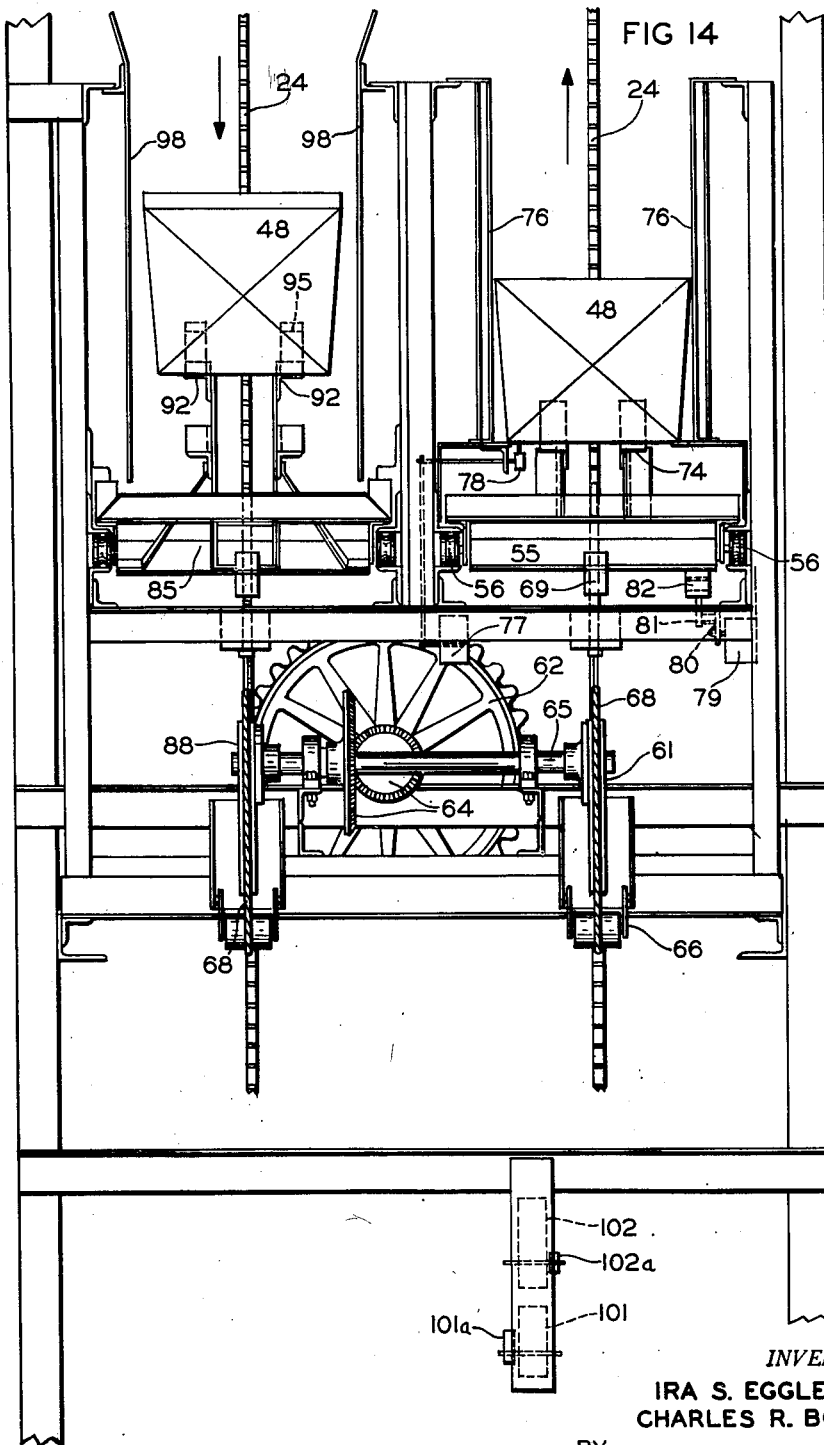
INVENTORS
IRA S. EGGLESTON
CHARLES R. BOLLER
BY
*John E. Thayer*
ATTORNEY

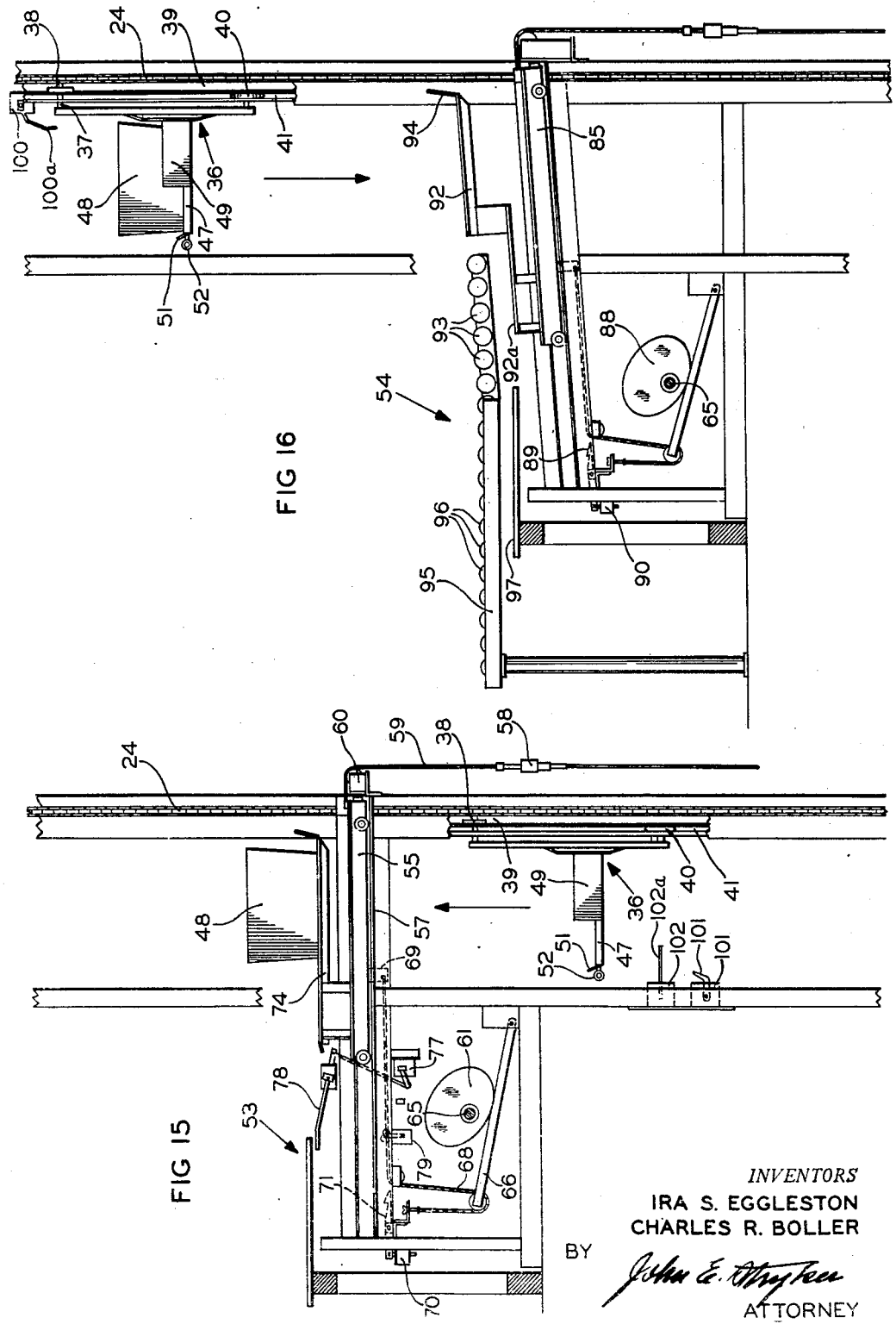

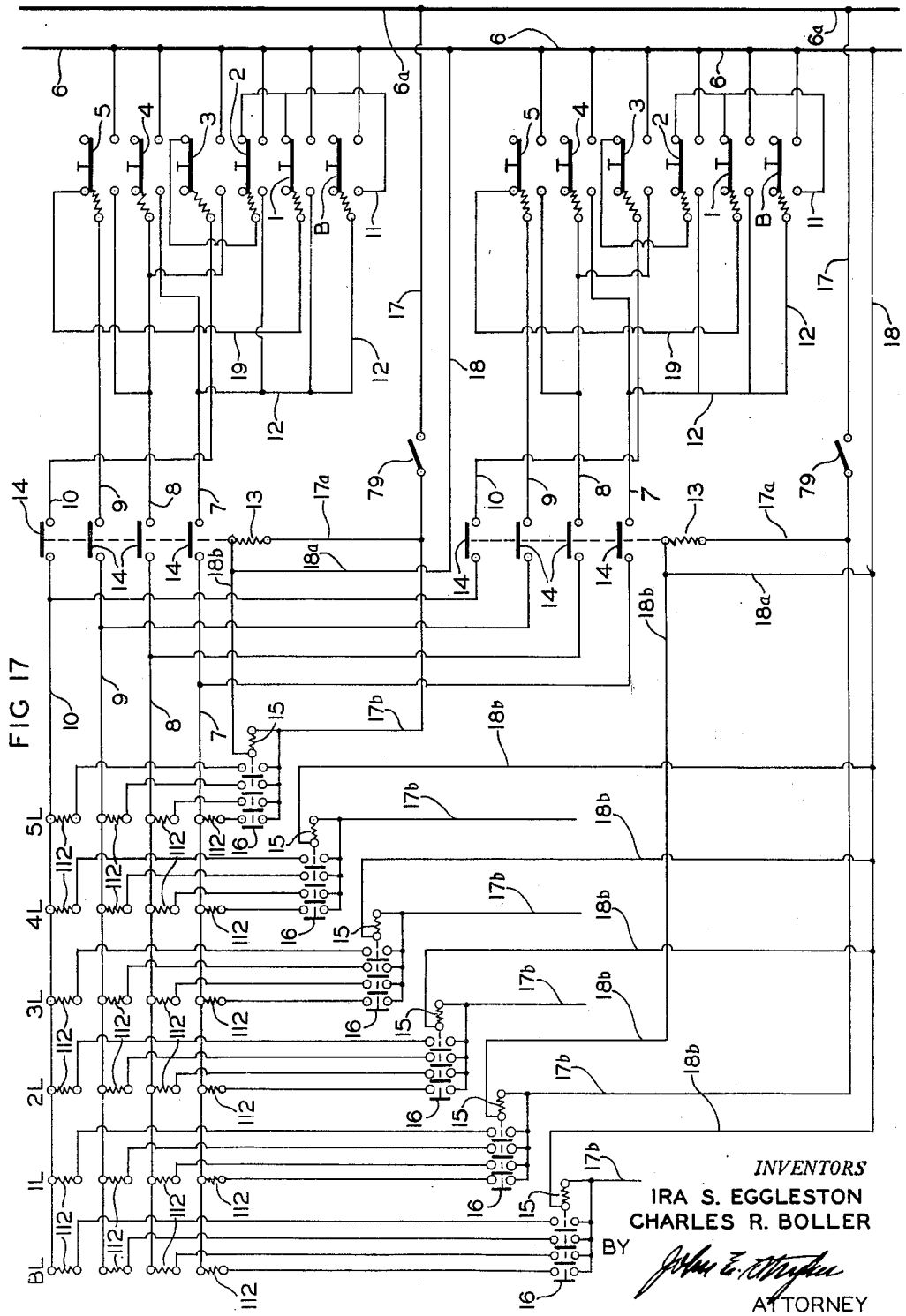

July 1, 1952 — I. S. EGGLESTON ET AL — 2,601,915
TIMING MECHANISM AND CONTROL FOR CONVEYERS
Filed Aug. 21, 1950 — 9 Sheets-Sheet 9
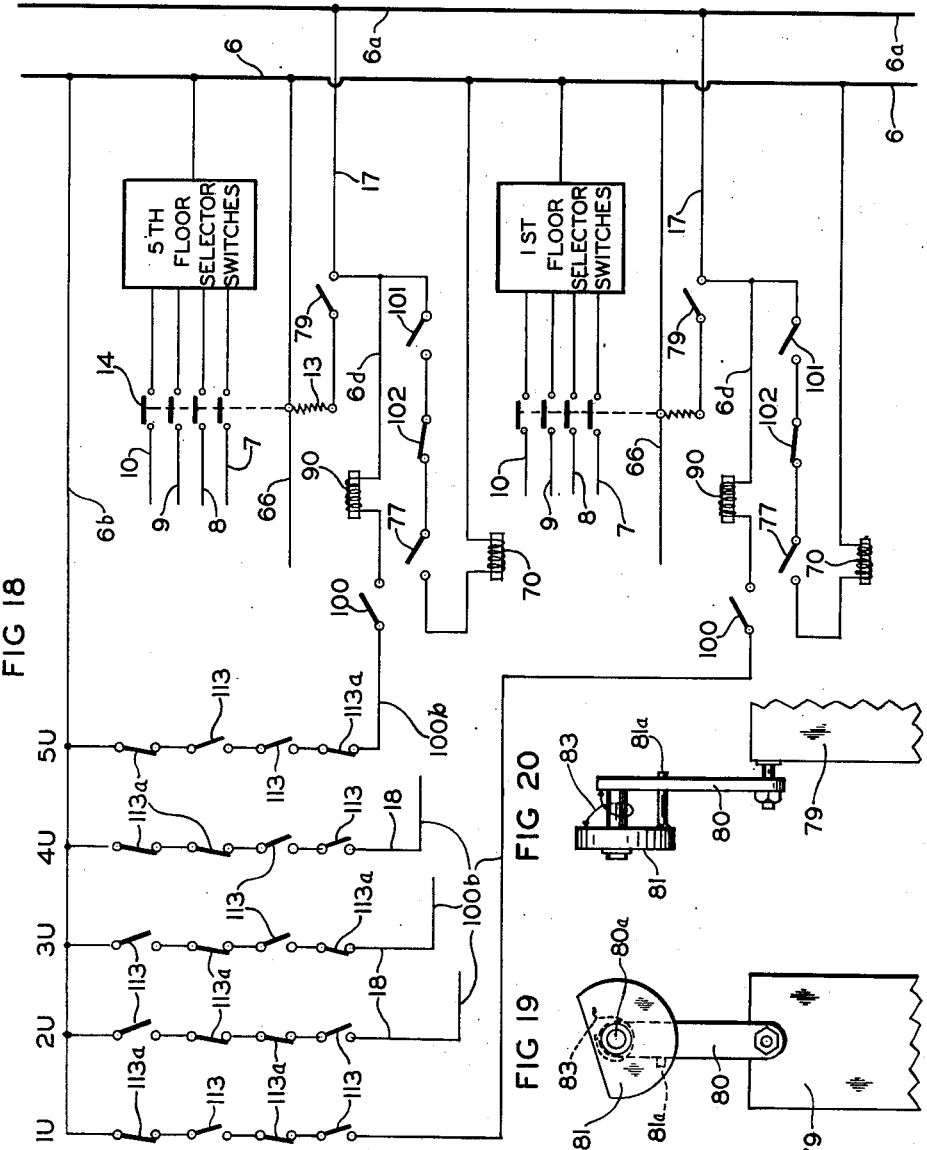
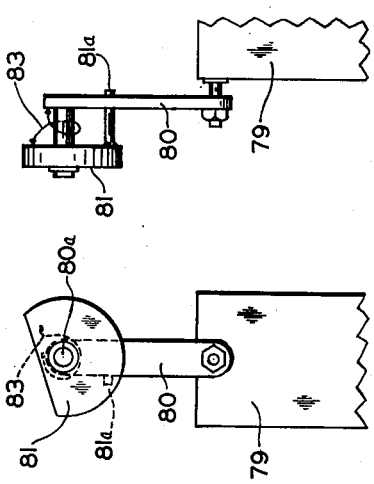
*INVENTORS*
IRA S. EGGLESTON
CHARLES R. BOLLER
BY
*ATTORNEY*

Patented July 1, 1952

2,601,915

UNITED STATES PATENT OFFICE 2,601,915

TIMING MECHANISM AND CONTROL FOR CONVEYERS

Ira S. Eggleston, St. Paul, and Charles R. Boller, North St. Paul, Minn., assignors to Standard Conveyor Company, St. Paul, Minn., a corporation of Minnesota Application August 21, 1950, Serial No. 180,598

11 Claims. (Cl. 198—38)

This invention relates to timing mechanism and controls for conveyors adapted to carry load units from any of a number of despatching stations to any of a number of receiving stations spaced along the path of the conveyor, the controls including a group of electric switches associated with each of the despatching stations and manually operable to select the receiving station to which any particular load unit is to be delivered automatically by operation of the conveyor and suitable loading and unloading mechanisms.

It is an object of our invention to provide improved timing mechanism and controls of the class described which are particularly adapted to the operation of conveyors or elevators having a multiplicity of despatching and receiving stations and where it is desired to convey load units from any of a number of despatching stations to any selected receiving station with a minimum of manual labor, rapidly and with certainty.

A particular object is to provide electric controls for conveyor loading and unloading mechanisms which coact with a number of timing units operating in unison and in timed relation to the conveyor and each carrying a series of switch actuating elements which are movable by electrically energizable means to operative position individually, the selection of the particular receiving station to receive a load being obtained by the combined operation of a plurality of the timing units and the number and location of the switch actuating elements which are moved to operative position for each selection being under control of a manually operable selector switch arranged to close a plurality of circuits which include the electrically energizable means for rendering selected switch actuating elements operative, a selector switch being provided at each despatching station for each receiving station to be controlled and each of the several selector switches at a despatching station being adapted to close a different combination of circuits including the operating means for different combinations of the switch elements carried by the several timing units.

Our invention also includes certain other controls which insure precise synchronization of the load carriers of a conveyor or elevator with the operation of the loading and unloading mechanisms for the several stations and with switch operating timer elements, as more fully described and pointed out in the following specification and claims.

By the present invention we reduce the number of parts and circuits required to insure proper timing of the several loading operations with the unloading operations at the selected receiving stations for conveyors or elevators having large numbers of despatching and receiving stations.

The invention will be best understood by reference to the accompanying drawings which illustrate, by way of example and not for the purpose of limitation, a preferred embodiment of our invention wherein a conveyor or elevator is adapted to receive load units from and deliver such units to any selected station or floor under control of selector switches located at the several floors, the conveyor being of the type having an endless chain to which is attached at suitable intervals load carriers adapted to receive load units or boxes from the several loading stations and to be unloaded at various selected floors or stations by unloading mechanisms.

Referring to the drawings:

Figure 1 is a diagrammatic elevational view showing the conveyor and the driving connections with our improved timer;

Fig. 2 is a somewhat diagrammatic upper end view of the conveyor and connections with the timer;

Fig. 3 is a horizontal sectional view through the timer taken approximately on the line 3—3 of Fig. 1;

Fig. 4 is a vertical sectional view through the timer taken on the line 4—4 of Fig. 2 and with a number of the duplicate parts omitted for clearness;

Fig. 5 is a fragmentary sectional view through one of the timer units taken on the line 5—5 of Fig. 3;

Fig. 6 is a top plan view showing one of the unload switches and the support therefor;

Fig. 7 is a side elevational view of one of the unload switches and showing a portion of the adjacent timer unit and one of the switch actuating elements in retracted position;

Fig. 8 is an end view of two of the switch contact plates for the timer unloading switches;

Fig. 9 is a front elevational view of the switch contact plates;

Fig. 10 is a fragmentary part elevational view and part vertical sectional view showing one of the fixed cams for retracting the switch actuating elements of the timer, together with a fragmentary portion of a timer unit;

Fig. 11 is a horizontal sectional view through the conveyor frame and showing the loading and unloading mechanisms at one of the floors or stations;

Fig. 12 is a side elevational view of the loading mechanism at one of the stations and with portions of the guide walls and certain frame members cut away to show parts otherwise concealed;

Fig. 14 is an elevational view of the loading and unloading mechanism looking in the direction indicated by the line 14—14 of Fig. 11;

Fig. 15 is a somewhat diagrammatic side elevational view showing one of the loading mechanisms in conveyor loading position;

Fig. 16 is a similar side elevational view showing one of the unloading mechanisms in extended or conveyor unloading position;

Fig. 17 is a wiring diagram showing, in detail, the circuits under control of the selector switches of two typical stations, together with the timer loading circuits for a system having six despatching stations;

Fig. 18 is a wiring diagram showing a suitable arrangement of timer actuated unload switches together with the unload circuits for two typical stations and automatically operated controls and circuits for the loading mechanism for the same stations, and Figs. 19 and 20 are detail front and side views respectively of one of the loading time starter switches.

Figure 13:
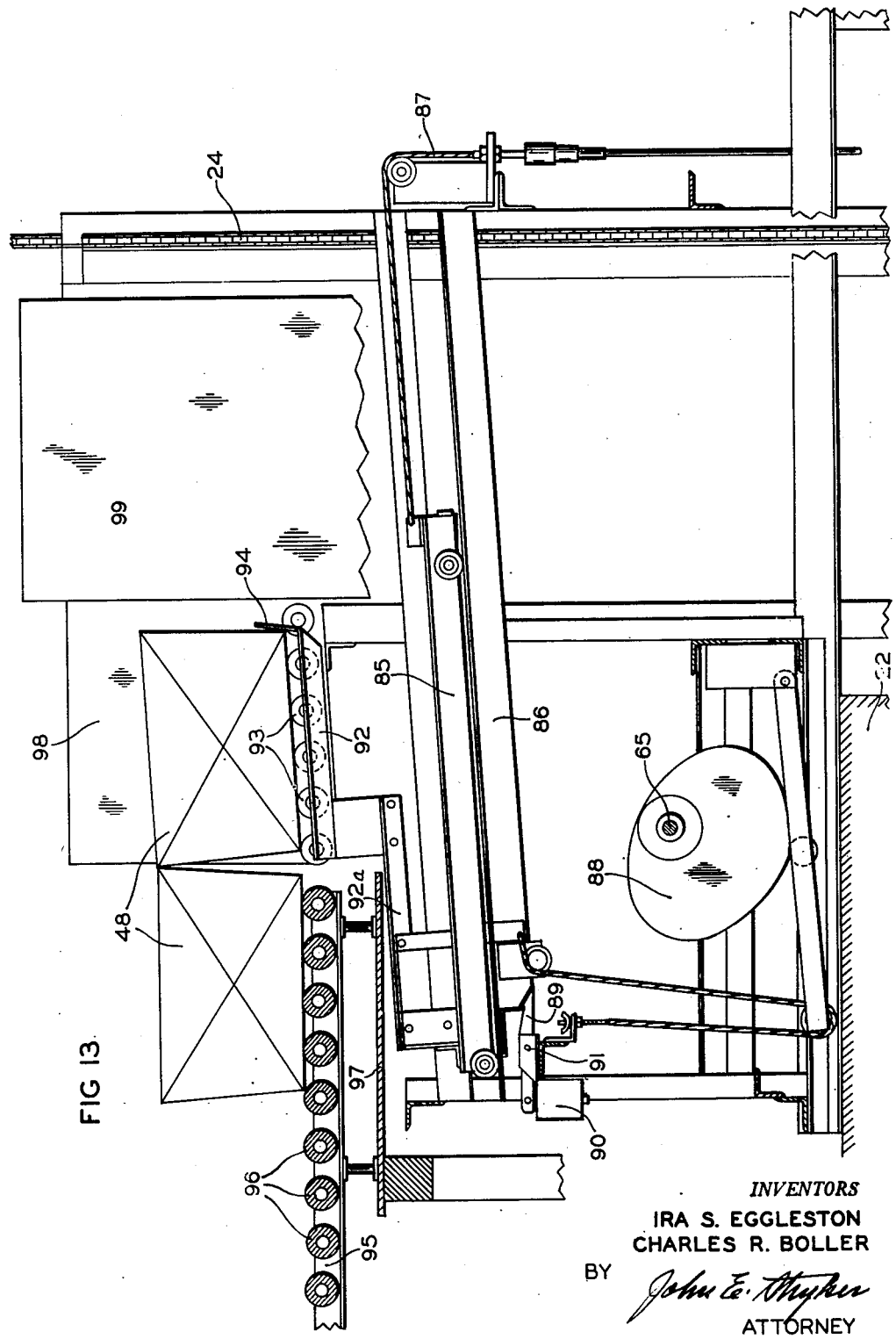
Fig. 13 is a part side elevational view and part vertical sectional view showing the unloading mechanism at one of the receiving stations.

As indicated in Fig. 1, the conveyor has a vertically elongated frame indicated generally by the numeral 20 extending from the basement 21 up through openings in the several floors 22 and 23 of the building, the floor 23 being the top floor on which suitable mechanism for actuating the conveyor and connecting it to the timer are mounted. Any desired number of intermediate floors or stations may be provided with despatching and receiving mechanism under control of a suitable number of timer units. An endless conveyor chain 24 is suspended from a sprocket wheel 25 at the upper end of the frame 20 and this sprocket wheel may be driven by an electric motor 26 through suitable speed reducing gearing in a housing 27 and through sprocket wheels upon which a chain 28 is trained for turning a main shaft 29 upon which the sprocket wheel 25 is fixed. Our improved timer, indicated generally by the numeral 30, may be actuated continuously in timed relation to the conveyor by suitable connections with the shaft 29, the connections including sprocket wheels and a chain 31 for driving a shaft 32 and a worm 33 fixed on the shaft 32 and arranged to drive a worm wheel 34 fixed on the upper end of a vertical timer shaft 35.

Load carriers indicated generally by the numeral 36, and best shown in Figs. 2, 11, 15 and 16, are mounted at suitable intervals on the conveyor chain 24, each carrier being suspended from a pin 37 and having a guide roller 38 adapted to travel between guide channels 39 (Fig. 11) of the elevator frame. The lower end of each load carrier is provided with a guide wheel 40 which travels between guide channels 41 of the elevator frame. In order to retain the load carriers 36 in upright position continuously as they are moved along the path determined by the chain-supporting sprocket 25 and idler sprocket wheel 42 at the lower end of the conveyor, notched disks 43 and 44 are provided near the upper and lower ends respectively of the frame for engagement with the guide wheels 40 during the reversal of the direction of travel of the carriers at the upper and lower ends of the conveyor. The upper notched disk 43 is driven in timed relation and at a peripheral speed equal to that of the chain 24 by suitable connection with the shaft 29, including sprocket wheels fixed respectively on the shaft 29 and on an axial shaft supporting the disk 43, these sprocket wheels being connected by a chain 45 (Fig. 2). The lower notched disk 44 is similarly driven by connections with a shaft 46 supporting the chain guide sprocket wheel 42 near the lower end of the conveyor frame. Further details of a conveyor similar to that illustrated and described herein are described in Patent No. 1,919,934 to William T. Donaldson, dated July 5, 1933.

Each of the carriers 36 has a pair of horizontally extending arms 47 adapted to support load units, e. g., boxes 48 which fit between a pair of low side wall members 49 mounted on each carrier 36. Stops 50 project upward from the back of each carrier for engagement with one end wall of the box 48 and fingers 51 project upward from the front ends of the carrier arms 47 to confine the boxes against accidental displacement to the front side of the conveyor. Each carrier is also provided with a roller 52 which projects from the front end of one of the arms 47 for actuating one of the electric control switches provided for each loading station, as hereinafter described. In operation, the conveyor chain 24 may be continuously driven to move a succession of the load carriers 36 upwardly adjacent to a series of despatching or loading stations, indicated generally by the numeral 53, and downwardly adjacent to a series of receiving or unloading stations indicated generally by the numeral 54.

Details of the loading mechanism at each of the despatching or loading stations 53 are best shown in Figs. 11, 12 and 14, this mechanism being duplicated at the several despatching stations. Each loading mechanism comprises a carriage 55 having anti-friction rollers 56 supporting it on rails 57 and movable to carry the boxes 48 into the path of the ascending carriers 36. The carriage 55 is biased toward loading position by weight actuated mechanism including a pair of weights 58 suspended from cables 59, each connected to the carriage 55, the cables being trained over rollers 60. Movement of the carriage to and from extended or loading position is controlled through suitable connections with a cam 61 which is continuously operated in timed relation to the conveyor chain 24 by means of a large sprocket wheel 62 engaging one of the reaches of the chain 24 and operating a shaft 63 which is connected by beveled gears 64 to a shaft 65 upon which the cam 61 is fixed. The periphery of the cam 61 engages a roller carried by a lever 66 and the free end of this lever is provided with a pulley 67 upon which is trained a cable 68. One end of this cable is anchored on the supporting frame of the loading station and the other end is connected to a bracket 69 depending from the carriage 55.

Electrically energizable means comprising a solenoid 70 arranged to operate a latch lever 71 are provided to releasably hold the carriage 55 in retracted position. Latch lever 71 is pivoted at 72 on a suitable fixed bracket and is engageable with a bracket 73 depending from the carriage 55. A pair of elevated arms 74 are provided on the carriage 55 to support the load units or boxes 48. These arms extend horizontally and their outer end portions are retracted beneath a loading platform 75 when the carriage is in its retracted position. Sheet metal side walls 76 are adapted to guide the boxes 48 to loading position on the arms 74.

Among the electric controls for the loading mechanism at each despatching station is a normally open switch 77 which is operatively connected to an arm 78 adapted to be actuated to close the switch 77 when a box 48 is placed in proper position for loading on the arms 74. Another electric loading control comprises a normally open switch 79 which is adapted to be closed momentarily upon movement of the carriage 55 to conveyor loading position. The switch 79 is provided with an upwardly extending arm 80 which is spring biased to normally retain the switch open and carries at its upper end a cam 81 which is spring biased toward upwardly extended position. The cam normally projects in the path of a pendant bracket 82 mounted on the carriage 55. As best shown in Figs. 19 and 20, a pivot pin 80a supports the cam 81 on the arm 80 and a stop lug 81a prevents the turning of the cam during the forward movement of the carriage. By this construction, the switch 79 is closed momentarily during the travel of the carriage 55 toward loading position and the cam 81 is retracted downward against the bias of a spring 83 as the carriage 55 is returned to its retracted position, without again closing the switch 79. Each loading station is further provided with a pair of fixed side wall members 84 extending along opposite sides of the path of the load carriers 36.

Unloading mechanism for each of the receiving stations is best shown in Figs. 11, 13 and 14. Each of these stations has a roller supported carriage, indicated generally by the numeral 85, movable along suitable rails 86 which are so inclined as to cause the load units to be deposited on the station rollers when the carriage is retracted. A pair of weighted cables 87 bias the carriage 85 toward an extended position in the path of the load units 48 carried by the conveyor and movement of this carriage to and from extended position is under control of a cam 88 fixed on the shaft 65. As hereinbefore indicated, shaft 65 is operated in timed relation to the conveyor chain 24. As best shown in Fig. 14, the driving connections for the cam 88 are common to those for cam 61 of the loading mechanism located at the same floor and cam 88 is operatively connected to the carriage 85 by mechanism similar to that hereinbefore described with reference to the loading station. Latch mechanism for releasably retaining the carriage 85 in retracted position comprises a solenoid actuated latch lever 89 pivotally supported on a pin 91 and arranged to be actuated to carriage release position upon the energization of a solenoid 90. The pin 91 is supported on a suitable bracket fixed on the station frame.

To receive and support the boxes 48, individually, the carriage 85 is provided with a pair of elevated arms 92 which are adapted to be extended, as in Fig. 16, and to be retracted, as in Fig. 13, to carry a box from the conveyor to a series of anti-friction wheels 93 of the fixed receiving station. Each of the arms 92 has an upwardly bent forward end 94 adapted to engage the boxes as they are removed from the conveyor. Boxes removed by the carriage 85 from the main conveyor or elevator are delivered by gravity from the wheels 93 to a receiving station conveyor 95 having a series of rollers 96 adapted to receive and support a number of the boxes 48. The conveyor 95 extends above a platform 97 and a supporting frame 92a for the arms 92 is retracted beneath the platform 97 when the carriage 85 is moved to the retracted position shown in Figs. 11 and 13. Each receiving station is further provided with side wall members 98 adapted to guide the boxes 48 as they are withdrawn from the conveyor and side wall members 99 are disposed in continuation of the members 98 to guide load units or boxes 48 as they are moved along the main conveyor and as they are unloaded to the receiving station. The unloading mechanism hereinbefore described may be duplicated at each of the several receiving stations.

As indicated in Figs. 11 and 16, an electric switch 100 is provided with an arm 100a which is located a predetermined distance above the unloading station and with the arm 100a in the path of the descending carriers 36 approaching the station. This switch is normally open and is closed momentarily when the arm 100a is actuated by a descending carrier. Switch 100 is included in an electric circuit which also includes the unloading solenoid 90 of the associated unloading mechanism. Each unloading station may be provided with a similar switch 100 for controlling the energization of the local solenoid 90, to thereby control the exact time of the starting of the unloading carriage 85 toward conveyor unloading position.

Additional switches are arranged to be actuated by ascending carriers upon their approach to the several loading stations for the purpose of distinguishing between approaching loaded and empty carriers and to coordinate the start of each loading operation with the conveyor operation. Switches 101 and 102, shown in Figs. 14 and 15, are provided for this purpose. The switch 101 is normally open and is provided with an arm 101a which is arranged to be actuated to close the switch momentarily when engaged by a roller 52 of a passing carriage 36. The switch 102 is normally closed and is opened when actuated by contact with a box 48 carried by an ascending load carrier. As hereinafter more fully described, the switches 101, 102 and 77 are in electrical series in a circuit which includes the solenoid 70 of the associated loading station.

*Timer construction*

Our improved timer, indicated generally by the numeral 30 is enclosed in a substantially cylindrical casing 103 (Figs. 3 and 4). As hereinbefore indicated, the vertical timer shaft 35 is continuously driven during the operation of the conveyor at a speed which is proportional to the speed of the conveyor chain 24. Fixed on the shaft 35 in spaced relation one to another are a plurality of timing devices comprising wheels 104, 105, 106 and 107, each of which carries a multiplicity of switch actuating elements comprising pins 108 which are independently movable from an upwardly retracted position to a downwardly extended position. The lower end portion of each pin 108 carries a roller 109 for actuating the switches hereinafter described when the pin and roller are in downwardly extended positions. As shown in detail in Fig. 5, each pin 108 is provided with a spring actuated detent ball 110 which engages the pin in a recess therein to normally retain the pin in the upwardly retracted position shown in full lines in Fig. 5. The several wheels 104—107 are similarly constructed and each carries the same number of pins 108 spaced apart circumferentially of the wheels equal distances.

Mounted adjacent to the peripheries of the wheels 104—107 are vertical series of levers 111 adapted to actuate the pins 108 of the several vertical rows and each of the levers 111 is adapted to be actuated by electrically energizable means comprising a solenoid 112. A vertical series of the levers 111 with their actuating solenoids 112 is provided for each loading station and the several series of levers 111 are spaced along the circular path of travel of the pins 108 distances which are approximately proportional to the spacing along the path of the conveyor of the several loading stations. In the particular arrangement shown in Fig. 3, the pin actuating levers 111 and their actuating solenoids 112 are mounted in vertical series of four each on fixed vertically extending angle bars and the several series are designated respectively BL, 1L, 2L, 3L, 4L and 5L, representing suitable control elements for a building having despatching stations for a basement floor and each of five other floors. In Fig. 4 only one vertical series of the pin actuating levers 111 and solenoids 112 are shown, this series being designated BL. The other series of pin actuating levers and solenoids have been omitted from Fig. 4 for clearness. For like reasons a large number of duplicate sets of pins 108 and all except one series of the unload switches presently to be described have been omitted from Fig. 4.

The several timing devices comprising wheels 104—107 are rotated in the direction indicated by an arrow in Fig. 3 and spaced circumferentially of these wheels from the loading solenoids are vertical series of unloading switches 113—113a, the several series being designated as 1U, 2U, 3U, 4U and 5U. Each series comprises four unloading switches mounted on a vertically extending angle bar and severally arranged to be actuated by the rollers 109 carried by the wheels 104—107. Each of the switches 113 is normally open and has a contact plate 115 fixed on the upper end portion of a switch actuating arm 114 and each of the switches 113a is normally closed and carries a longer contact plate 116 on the upper end of its actuating arm. As shown in Figs. 8 and 9, the contact plates 115 are shorter circumferentially of the timer wheels than the plates 116. The four contact plates of the same series are aligned vertically below the peripheries of the wheels 104—107 respectively and the vertical center lines of the plates 115 and 116 of the several series 1U—5U are spaced apart circumferentially of the timer wheels distances which are approximately proportional to the spacing along the conveyor of the several unloading mechanisms at floors 1, 2, 3, 4 and 5 from the loading mechanisms at these floors.

In order to retract upwardly all downwardly extended pins 108 at the end of each cycle of operation of the wheels 104—107, I provide a vertical series of fixed cams 117. Each cam 117 is supported on a bracket 118 which is rigidly mounted on a vertically extending angle bar 119 in such position as to cause the inclined upper surface of each cam to extend in an arc at such an elevation as to be engaged by the lower ends of the pins 108 and to force each extended pin upward to its retracted position.

In operation the several timer wheels 104—107 are rotated in unison. Energization of the several solenoids 112 of each vertical series is under control of a group of manually operable selector switches at one of the despatching stations. For example, as hereinafter more fully pointed out, the selector switches at floor 1 of the building are arranged in circuits to severally energize one or more of the solenoids of series 1L and other groups of selector switches located respectively at the basement floor, second, third, fourth and fifth floors are provided to control the energization of the solenoids of series BL, 2L, 3L, 4L and 5L respectively. The unloading switches 113 and 113a of each vertical series are included in series in a circuit which also includes the unloading switch 100 and solenoid 90 of an associated receiving station.

*Selector switches and circuits*

Two groups of manually operable selector switches are shown in the wiring diagram, Fig. 17. Each group is adapted to control the delivery of load units to six receiving stations located at the several floors of the building and the several switches of each group are indicated respectively by the reference characters B, 1, 2, 3, 4 and 5. Current is supplied to the several branch circuits from supply lines 6 and 6a. The selector switches are preferably push button switches which are normally in the positions indicated in Fig. 17 wherein a number of branch circuits extending from the current supply line 6 and including branch circuit conductors 7, 8, 9 and 10 are open. Each of these switches is preferably of the type which, when closed, maintains contact until released by the closing of another switch of the same group. For example, switch B when moved from its normal open position shown to a closed position causes the closing of a circuit from a branch of the line 6 to each of branch conductors 11 and 12 and the switch is locked in this closed position until one of the other switches of the same group is closed, whereupon switch B is released to open position. Each of the other switches 1—5 operate in a similar manner to control different combinations of branch circuits, including selected combinations of the conductors 7—10.

The time of closing of the branch circuits for each despatching station including the conductors 7, 8, 9 and 10 is under control of a switch 79 and a four-pole relay for the same station, this relay having a coil 13 and armature actuated spring contacts 14 adapted to simultaneously close one side of the several circuits including the solenoids 112 of the same series. The closing of the other side of the circuit for the solenoids 112 of a series is also under control of the switch 79 for the same series and a four-pole relay having a coil 15 and armature actuated spring contacts 16. Each circuit under control of a switch 79 also includes a conductor 17 extending to the supply line 6a, branches 17a and 17b extending to terminals of the relay coils 13 and 15 respectively, and a conductor 18 connected to line 6 and having branches 18a and 18b extending to terminals of the relay coils 13 and 15 respectively. It will be evident from Fig. 17 that only two of the groups of manually operable switches are shown with the complete circuits under control thereof, the particular groups illustrated being those for the first and fifth floor despatching stations. The selector switches and circuits for the other despatching stations are similar to those shown in detail. The several series of solenoids 112 designated respectively BL, 1L, 2L, 3L, 4L and 5L are thus under control of the several switches 79 and four-pole relays the coils of which are energized when a switch 79 is closed.

Each of the selector switches B, 1, 2, 3, 4 and 5 is operative through a different combination of branch circuits including selected conductors 7, 8, 9 and 10 to energize different combinations of the solenoids 112 of the series associated with the particular despatching station. For example, as indicated in Fig. 17, upon the closing of push button switch 1 at any despatching station current is supplied from line 6 to conductors 12 and 7, as one branch circuit, and to conductor 19, back contact of switch 5 and movable element of switch 5 which is continuously connected to conductor 9, as a second branch circuit. Thus when switch 1, associated with floor 5 is actuated to closed position and the loading carriage at floor 5 closes switch 79, as hereinbefore described, relays 13 and 15 associated with series 5L of solenoids 112 are energized, with the result that solenoids 112 in circuit with conductors 7 and 9 respectively are energized. These are the lowermost and second from top solenoids of series 5L. In a similar manner, upon the closing of selector switch 2 associated with the loading mechanism of floor 1, followed by the closing of switch 79 for the same floor, current is supplied through conductors 7 and 10 to energize the top and bottom solenoids 112 of series 1L. With the other branch circuits arranged as shown in Fig. 17, upon the closing of switches 3 and 79 of any despatching station, the top and third from top solenoids 112 of the series associated with the local despatching station will be energized. To send a load unit to floor 4, switches 4 and 79 of any floor may be closed thereby causing the energization of the third and fourth from top solenoids 112 of the series associated with the despatching floors. Upon the closing of switch 5 followed by the closing of switch 79 of the same floor the second and third from top solenoids 112 of the appropriate series will be energized.

Unloading circuits

Referring particularly to Fig. 18, which shows in detail a suitable arrangement of unloading switches operated by the timer, the several series of unloading switches are indicated in vertical columns designated 1U, 2U, 3U, 4U and 5U respectively. It will be noted that unloading switches 113 of each series are normally open and that each of the switches 113a is normally closed. Each of the normally closed switches 113a is provided with one of the longer contact plates 116 and each of the normally open switches 113 is provided with one of the shorter contact plates 115. The several series of unloading switches are included in parallel circuits having a common current supply conductor 6b extending to line 6 and each circuit includes a conductor 100b extending to one terminal of the unloading switch 100 for the associated unloading mechanism and suitable circuit connections whereby the unloading solenoid 90 for the selected receiving station may be energized upon the closing of the switch 100 thereof during the period when the same circuit is closed at the switches 113 and 113a, this circuit including a branch 6d of current supply line 6a.

Complete unloading circuits for the first and fifth floor stations are shown in Fig. 18 and it will be understood that these circuits are duplicated for the unloading mechanisms of the second, third and fourth floors. The unloading mechanism for another floor, e. g. the basement, may be of the fixed rake-off type and where such mechanism is provided it is unnecessary to provide an electrically controlled unloading mechanism at the receiving station.

Automatic loading controls and circuits

As further shown in Fig. 18, each loading solenoid 70 is in series with the switches 77, 101 and 102. When a load unit or box 48 is placed in proper position on the loading carriage 55 of the station, the switch 77 is closed. Thereafter, the switch 101 associated with the same loading station is closed by an approaching empty load carrier to thereby energize the latch operating solenoid 70, the switch 102 being normally closed but being opened upon the approach of a loaded carrier. Suitable loading circuits for the first and fifth floor stations are illustrated and it will be understood that these circuits are duplicated for each of the loading mechanisms at the second, third and fourth floors and other despatching stations.

Operation

With the conveyor and timer in operation the carriages 36 are in continuous motion along a path determined by the chain 24 and the timer wheels 104—107 are in continuous relatively slow and synchronized rotary motion. Load units or boxes 48 may be despatched from any floor or despatching station and sent to any receiving or unloading station under control of the selector switches at the despatching stations. An operator desiring to send a box 48 from the first floor to the fifth floor, for example, merely closes switch 5 at the first floor and then places the box in the loading position between the walls 76 where it rests on the arms 74 and depresses switch arm 78 thereby closing the normally open switch 77. The first empty ascending carriage 36 that reaches the switch 101 will close this normally open switch and thereby complete the circuit including the loading solenoid 70 of the local station. If, however, the ascending carrier 36 has been previously loaded from a lower floor, the box 48 on the carrier will engage the switch arm 102a and open the normally closed switch 102 before the wheel on this particular carrier 36 makes contact with the arm of switch 101. Since the switches 101, 102 and 77 are in series, the opening of switch 102 will prevent the solenoid 70 from being energized and the loading carriage will not be released to position for loading the box when the approaching carrier 36 has previously been loaded.

Upon the closing of the circuit including the latch operating solenoid 70 of the local station, the loaded carriage 55 is actuated by the weights 58, under control of the cam 61, toward loading position. At this time, it is necessary to actuate a selected combination of timer pins 108 which determine the destination of the particular load unit. If the load unit on carriage 55 is to be sent to the fifth floor from the first floor, as in the example mentioned, the closing of the selector switch 5 at the first floor will cause, upon the closing of switch 79, the energization of the second and third solenoids 112 of series 1L through the circuits including the conductors 8 and 9. This occurs at the instant switch 79 is closed by engagement of the moving carriage member 82 with the cam 81 of switch 79. The circuits thus closed momentarily include the relay 13 of the local loading station and the relay 15 which closes the four branch circuits, including the selected series of solenoids 112. These relays prevent feed back and resultant uncertainties of operation due to the fact that each selector switch remains closed until such time as another switch of the same group is actuated to closed position. Upon energization of the selected solenoids 112, the solenoid operated levers 111 force down the selected pins 108 to their switch operating positions.

After closing the switch 79 the loaded carriage 55 continues to its extended position indicated in Fig. 15 and immediately thereafter the ascending empty carrier 36 picks up the box 48 and conveys it to its selected destination. Since the cam 61 is continuously rotating in timed relation to the conveyor chain 24, this cam causes the carriage 55 to be returned to its normally retracted position upon removal of the load unit or box 48 by the ascending carriage 36. During the period of time required to carry the box 48 from the despatching station to the selected receiving station, timer wheels 104—107 will have rotated through an arc such as to bring the downwardly extended pins 108 of the selected series to a position where they contact the plates 115 of a plurality of the switches 113. As will be evident from Fig. 18, in order to actuate the unloading mechanism for the fifth floor, it is necessary to close the second and third switches 113 of series 5U while retaining the normally closed switches 113a of the same series closed. In the example assumed, the normally open switches 113 are closed simultaneously by the downwardly extended pins 108 carried by timer wheels 105 and 106. These unloading switches are closed just before the loaded carriage reaches the unloading switch 100 of the selected unloading station and the switches 113 are held closed for a sufficient period of time for the switch 100 to be closed at the precise moment when the cam 88 of the unloading station is in position to allow the carriage 85 to move to extended loading position. Upon the closing of the switch 100, the solenoid 90 is energized and operates the latch 89 to release the carriage 85. Thereupon, the carriage moves in and the box 48 is deposited on the arms 92 of the selected unloading station. The carriage 85 is then retracted by operation of the cam 88, to thereby deliver the box to the receiving conveyor 96.

By providing one or more normally closed switches 113a in each series of unloading switches, we insure against errors in the selection of the several unloading stations where particular load units are to be delivered. For example, with the open and closed switch arrangement of series 5U, in the event that pins 108, other than those carried by wheels 105 and 106 and in a common vertical row, are in the downwardly projecting position one or more of the normally closed switches 113a will be opened as the wheels carry the pins to position where their rollers 109 engage the switch plates 115 and 116 of series 5U. The contact plates 116 of the switches 113a being longer than the plates 115 of the switches 113 will cause the circuit to be held open during the period of closing of the switches 113 of the same series, thereby preventing the erroneous closing of the loading circuit for floor five. The arrangement of the normally open switches 113 and normally closed switches 113a in each series differs from the arrangement in all other series 1U—5U.

In order to automatically close the normally open switches 113 of each series at the proper time, various combinations of the pins 108 carried by the several wheels 104—107 are projected downward by operation of the solenoids 112 of the several series BL, 1L—5L and the selection of the particular combinations of pins 108 to be rendered operative is under control of the selector switches, each of which is operative through branch circuits to energize a different combination of the solenoids 112 of each series.

By providing four timing devices comprising the wheels 104—107 and associated loading solenoids and unloading switches, we make it possible to select any one of a number up to fifteen receiving stations from any of sixteen despatching stations, with one receiving station provided with fixed unloading mechanism or a load rakeoff device so that the load units are not recirculated by the conveyor.

In some installations it is important to prevent the simultaneous loading of a plurality of the carriers 36 at two or more stations. This may occur, in the absence of the switches 79 and the several relays 13 controlled thereby, where the distance between certain floors or despatching stations is equal to an integral multiple of the spacing of the load carriers 36 along the conveyor. Errors in selection of the receiving stations would occur, in the absence of the switches 79 and relays, if a conveyor load carrier should close switch 101 at one floor at the same time that another carrier closes switch 101 at another floor. In order to avoid this and also to avoid variations in the synchronization of the several loading station cams 61, the several switches 79 may be variously positioned in relation to the path of travel of the loading carriages 55 so that no two of these switches, which control the timing of the energization of the solenoids 112, will be closed at the same instant by the loading mechanisms.

For the particular installation illustrated, by way of example, in the drawings there are six stations to which load units may be selectively delivered from any of six despatching stations. For such an installation nineteen of the load carriers 36 may be spaced equally one from another along the chain 24 at intervals of 121½ inches longitudinally of the chain and each of the timer wheels 104—107 may be provided with thirty-one switch actuating pins 108 equally spaced so that each pin travels .2464734 inch or approximately one-quarter inch circumferentially of the wheel carrying it for each one foot of travel of the conveyor chain 24. Thus each of the wheels 104—107 may turn 19/31 of a revolution for each complete cycle of movement of the chain 24. With such synchronization, the several pin actuating members 111 and switch contact plates 115 and 116 may be so located as to insure the desired positioning of all pins 108 in relation to the loading time control switches 79 and unloading switches 113, 113a.

The present invention is not limited to any specific number of timing wheels, load carriers or despatching and receiving stations and the controls and timer may be readily adapted for operation with a considerably larger or smaller number of despatching and receiving stations.

Having described our invention, what we claim as new and desire to protect by Letters Patent is:

1. For a power actuated conveyor movable along a determined path and having a plurality of despatching stations and a plurality of receiving stations spaced along said path and provided respectively with mechanism for loading units on and unloading them from said conveyor, an improved control and timer for the several loading and unloading mechanisms comprising a plurality of timing devices operated in unison and in timed relation to said conveyor and each carrying a series of switch elements which are movable individually to and from operative position, a series of actuating members for the switch elements of each series equal in number to the number of despatching stations and spaced along the path of travel of said switch elements distances which are approximately proportional to the spacing of the several despatching stations along said conveyor, electrically energizable means for severally operating said actuating members, a group of manually operable selector switches associated with each of said despatching stations for selecting the receiving station to which any load unit is to be delivered, a plurality of branch circuits under control of each of certain of the individual selector switches of each group, said branch circuits severally including the electrically energizable means for actuating switch elements carried by a plurality of said timing devices and the several selector switches of each group being operative through different combinations of said branch circuits to cause the movement of different combinations of said switch elements to operative positions, a series of unloading switches for each of said receiving stations having actuating members mounted in positions to be moved by such of said elements as are in operative positions, the actuating members for the several unloading switches being spaced along the paths of said switch elements distances which are approximately proportional to the spacing along the conveyor of the several receiving stations from the several despatching stations, circuits severally under control of the several series of unloading switches for the respective receiving stations, and electrically energizable means included in each of said last mentioned circuits for causing the unloading of the conveyor at selected receiving stations.

2. An improved control and timer as defined in claim 1 wherein each of the despatching stations is provided with a time starting switch adapted to cause the closing of the circuits under control of the local manually operable selector switches upon movement of the loading mechanism of the local despatching station to loading position.

3. An improved control and timer as defined in claim 1 wherein each of the despatching stations is provided with a time starting switch adapted to cause the closing of the circuits under control of the local manually operable selector switches upon movement of the loading mechanism of the local despatching station to loading position, and wherein the several time starting switches are variously located in relation to the path of movement of the several loading mechanisms whereby to guard against the simultaneous closing of said circuits for two or more of the despatching stations.

4. An improved control and timer as defined in claim 1 wherein a multiple pole relay is provided for closing the several branch circuits under control of each group of manually operable selector switches and a time starting switch is included in a circuit for energizing said relay, said time starting switch being actuated to close said last mentioned circuit upon movement of the loading mechanism of the local despatching station to loading position.

5. An improved control and timer as defined in claim 1 wherein each of said circuits severally under control of the several series of unloading switches includes a normally open switch adapted to be closed by operation of a member located along the path of the conveyor and actuated to closed position upon the approach of a load to the local receiving station whereby to fix the exact timing of the unloading operation.

6. An improved control and timer as defined in claim 1 in which said series of unloading switches for each of the receiving stations comprises a number of switches equal in number to the number of timing devices, said actuating means for the unloading switches being adapted to cause all of the switches of the same series to be closed by operation of selected combinations of said switch elements carried by the several timing devices.

7. An improved control and timer as defined in claim 1 in which each of said series of unloading switches includes at least one switch which is normally closed and adapted to be opened when actuated by a switch element carried by one of said timing devices and at least one switch which is normally open and adapted to be closed when actuated by a switch element carried by another of said timing devices.

8. An improved control and timer as defined in claim 1 in which each of said series of unloading switches includes at least one switch which is normally closed and adapted to be opened when actuated by a switch element carried by one of said timing devices and at least one switch which is normally open and adapted to be closed by a switch element carried by another of said timing devices, and means for causing the normally closed switches of the several series to dwell in open position during the closing of a normally open switch of the same series when such normally open and normally closed switches are substantially simultaneously actuated by switch elements in operative position carried by selected timing devices.

9. For a power actuated conveyor having a multiplicity of spaced load carriers movable along a determined path and a plurality of despatching stations and a plurality of receiving stations spaced along said path and provided respectively with mechanism for loading units on and unloading them from said load carriers, an improved timer and controls for the several loading and unloading mechanisms comprising a plurality of spaced parallel timing wheels adapted to be rotated in unison and in timed relation to said conveyor and each carrying a series of switch elements which are movable individually to and from operative position, a series of actuating members for the switch elements of each series equal in number to the number of despatching stations and spaced along the path of travel of the switch elements distances which are approximately proportional to the spacing of the several despatching stations along said conveyor, electrically energizable means for severally operating said actuating members to move selected switch elements to operative positions, a group of manually operable selector switches associated with each of said despatching stations for selecting the receiving stations to which load units are to be delivered, branch circuits under control of certain of the individual selector switches of each group, said branch circuits severally including the electrically energizable means for actuating switch elements carried by a plurality of said timing wheels and the several selector switches of each group being operative through different combinations of branch circuits to cause the movement of different combinations of said switch elements to operative positions, a series of unloading switches for each of said receiving stations severally provided with actuating members disposed in the paths of the switch elements when the latter are in operative positions, the actuating members for said unloading switches being spaced along said paths distances which are approximately proportional to the spacing along the conveyor of the several receiving stations from the several despatching stations, a circuit under control of the unloading switches of each series and electrically energizable means severally included in each of said last mentioned circuits for causing the unloading of the conveyor carriers at the selected receiving stations.

10. An improved timer and controls as defined in claim 9 in which each of said despatching stations is provided with a loading control circuit including electrically energizable means for causing the loading mechanism at said station to be actuated to carrier loading position, a normally open switch adapted to be closed by the placing of a load unit in loading position, and a second normally open switch adapted to be closed by an approaching empty carrier of the conveyor.

11. An improved control and timer as defined in claim 9 wherein each of the despatching stations is provided with a time starting switch adapted to cause the closing of the circuits under control of the local manually operable selector switches upon movement of the loading mechanism of the local despatching station to loading position and each despatching station is further provided with a loading control circuit including electrically energizable means for causing the loading mechanism at said station to be actuated to carrier loading position, a normally open switch adapted to be closed by the placing of a load unit in loading position, and a second normally open switch adapted to be closed by an approaching empty carrier of the conveyor.

IRA S. EGGLESTON.
CHARLES R. BOLLER.

No references cited.